(12) United States Patent
Fussell et al.

(10) Patent No.: US 7,467,179 B2
(45) Date of Patent: Dec. 16, 2008

(54) BACKPLANE ARCHITECTURE FOR A DATA SERVER

(75) Inventors: Andrew M. Fussell, Vancouver (CA); Paul R. Russell, Port Coquitlam (CA)

(73) Assignee: Radisys Canada Inc., Burnaby, B.C. (CA)

( * ) Notice: Subject to any disclaimer, the term of this patent is extended or adjusted under 35 U.S.C. 154(b) by 739 days.

(21) Appl. No.: 10/153,665

(22) Filed: May 24, 2002

(65) Prior Publication Data

US 2004/0003152 A1  Jan. 1, 2004

(51) Int. Cl.
*G06F 15/16* (2006.01)
(52) U.S. Cl. ............................ 709/200; 710/107; 714/3; 714/10
(58) Field of Classification Search ......... 370/241–465; 710/22–118; 725/119; 709/253, 230–237, 709/200, 201–203; 379/88.26; 714/43, 3, 714/10

See application file for complete search history.

(56) References Cited

U.S. PATENT DOCUMENTS

| | | | | |
|---|---|---|---|---|
| 4,625,081 A | * | 11/1986 | Lotito et al. | 379/88.26 |
| 4,985,830 A | * | 1/1991 | Atac et al. | 709/239 |
| 5,420,856 A | * | 5/1995 | Kerns | 370/359 |
| 5,761,200 A | * | 6/1998 | Hsieh | 370/364 |
| 5,764,895 A | | 6/1998 | Chung | |
| 5,784,582 A | * | 7/1998 | Hughes | 710/117 |

(Continued)

FOREIGN PATENT DOCUMENTS

EP   0 492 795 A2   7/1992

(Continued)

OTHER PUBLICATIONS

Goodwill et al., An ATMBased Intelligent Optical Backplane Using CMOS-SEED Smart Pixel Arrays and Free-Space Optical Interconnect Modules, Selected Topics in Quantum Electronics, IEEE Journal of vol. 2, issue 1, Apr. 1996, pp. 85-96.*

*Primary Examiner*—Andrew Caldwell
*Assistant Examiner*—Oleg Survillo
(74) *Attorney, Agent, or Firm*—Marks & Clerk; Richard J. Mitchell

(57) ABSTRACT

A media server for use in networks where media are transmitted in packet form comprises at least one card shelf containing at least one bus controller card, at least one other card such as a media processor card, and a backplane. The backplane includes a media bus group. Each packet has a routing header added to it. The data is optionally sent over a single media bus to a single card, or to a plurality of different cards. Framing information and clock pulse strings are passed to each card over the backplane. Each card is assigned an address, so that data sent from each card has a source address which is identified each time that card wishes to send data elsewhere. Also, data that is being addressed to each card will include the respective destination address of that card in its routing header. A failed card or bus can be sensed and isolated by the bus controller card, and packets will continue to be transmitted to the remaining cards over the remaining buses. In the case where a redundant bus controller is present, the redundant bus controller can detect errors, and take the active bus controller card out of service, and then become the active bus controller itself.

10 Claims, 3 Drawing Sheets

U.S. PATENT DOCUMENTS

| | | | |
|---|---|---|---|
| 5,809,021 A * | 9/1998 | Diaz et al. | 370/364 |
| 5,848,227 A | 12/1998 | Sheu | |
| 6,112,271 A | 8/2000 | Lanus et al. | |
| 6,249,834 B1 | 6/2001 | Henderson et al. | |
| 6,253,269 B1 * | 6/2001 | Cranston et al. | 710/107 |
| 6,269,081 B1 * | 7/2001 | Chow et al. | 370/241 |
| 6,430,636 B1 * | 8/2002 | Cranston et al. | 710/107 |
| 6,442,758 B1 * | 8/2002 | Jang et al. | 725/119 |
| 6,467,003 B1 * | 10/2002 | Doerenberg et al. | 710/117 |
| 6,519,739 B1 * | 2/2003 | Sandorfi | 714/799 |
| 6,564,340 B1 * | 5/2003 | Odegard et al. | 714/43 |
| 6,594,712 B1 * | 7/2003 | Pettey et al. | 710/22 |
| 6,631,483 B1 * | 10/2003 | Parrish | 714/55 |
| 6,735,218 B2 * | 5/2004 | Chang et al. | 370/471 |
| 6,738,356 B1 * | 5/2004 | Russell et al. | 370/260 |
| 6,754,762 B1 * | 6/2004 | Curley | 710/316 |
| 6,826,178 B1 * | 11/2004 | Leonard | 370/362 |
| 6,862,644 B1 * | 3/2005 | Pendleton et al. | 710/305 |
| 6,917,998 B1 * | 7/2005 | Giles | 710/300 |
| 7,085,875 B1 * | 8/2006 | Yona et al. | 710/307 |
| 7,124,163 B2 * | 10/2006 | Geofroy et al. | 709/203 |
| 7,289,513 B1 * | 10/2007 | Medved et al. | 370/395.31 |
| 2002/0105967 A1 * | 8/2002 | Chen | 370/465 |
| 2003/0005208 A1 * | 1/2003 | Farmwald et al. | 710/307 |
| 2003/0033463 A1 * | 2/2003 | Garnett et al. | 710/300 |
| 2003/0221019 A1 * | 11/2003 | Fussell et al. | 709/253 |

FOREIGN PATENT DOCUMENTS

EP          0 844 763 A2     5/1998

\* cited by examiner

BACKPLANE ARCHITECTURE FOR A DATA SERVER

FIELD OF THE INVENTION

This invention relates to data servers, and particularly relates to data servers which specifically function as media servers for use in association with telephony networks, video conferencing networks, and the like. The present invention is particularly directed to the backplane architecture for a data server of the sort described immediately above.

BACKGROUND OF THE INVENTION

Data servers generally find themselves in many circumstances for many purposes. However, the present invention is particularly directed to the use of data servers in media networks where the media data are transmitted in packet form. Such uses may specifically be in the purposes of media gateways and media servers for media networks such as telephony networks.

Indeed, it is in the environment of telephony networks, in particular, where the present invention finds particular utility. Telephony networks carry voice data, in particular, which has been coded into digital format. However, while the human ear maybe forgiving to a certain extent, it will not tolerate significant interruptions or delay in the passage of spoken messages. In other words, unlike data networks in which delays or interruptions in the delivery of packetized data may be tolerated, at least to some extent, the transmission and processing of voice messages, and also video messages and the like, must take place essentially in real time. Thus, data servers such as gateways and media servers must be constituted in such a manner that they are capable of functioning with high throughput and accuracy of data management and processing.

The following discussion is particularly directed to media servers, but it will be understood that the discussion is applicable as well to gateways and the like, as will be clear to those who are skilled in the art.

Media servers as they are employed in telephony networks, perform a variety of basic and enhanced services which include conferencing, interactive voice response, transcoding, announcement, and other advanced speech services. They may also be employed in networks which provide video conferencing services, as well as typical data exchange services of the sort which occurs over the Internet, over virtual private networks, within wide area networks and local area networks, and the like. In each instance, the data of any sort, whether it be voice, video, or numerical or text data, is packetized—that is, the data are sent in packets.

Media servers are connected directly to a packet network, and may therefore be found in use in many service provider locations including those who provide wireless, cable modem, xDSL, fibre, and copper access technologies; provided, however, that the core network within which the immediate server may be found is one which is based on packet technologies such as IP and ATM.

Media servers perform realtime processing of media streams which may originate from such devices as personal computers, IP phones, mobile phones, and traditional phones, via an appropriate media gateway. Typical functions that may be performed by media servers include decoding and collecting DTMF tones, they may play complex audio announcements, they may bridge multiple audio signals, they may transcode between different codec types and bit rates, they may level shift audio signals for automatic game control, and convert text to speech or speech to text. Media servers may also recognize voice commands, bridge video signals, and decode/encode fax streams.

Typically, media servers are part of an enhanced services infrastructure in softswitch architecture. The media servers will act as slaves to service logic which is resident in an application server or in a softswitch, and provide state-of-the-art hardware which may be upgraded and which exhibits almost unlimited scaleability, without regard to the service logic which may be employed in an application server or softswitch, and without regard to whether or not there is the presence of a media gateway such as that which is required for other than VOIP telephony.

Two other co-pending applications, Ser. Nos. 10/153,820, and 10/153,666, filed simultaneously herewith, describe other features and particularities of data servers, and particularly media servers of the sort generally contemplated herein. The present invention is particularly directed to the architecture of the backplane of a media server.

By the backplane architecture which is taught herein, a media server is provided which permits multi-point to multi-point communication structure, with redundant architecture.

In particular, as will be noted hereafter, there are multiple small buses which are permitted to run in parallel, so as to act as one large bus. Moreover, bus redundancy is provided because any one of the buses can be shut down and the other buses will still continue to operate. This is in contrast to conventional large buses which operate as a single unit, and require another large bus of equal structure in order to provide redundancy in the event of failure.

The present invention also provides for efficient communication between cards on a shelf in a media server.

SUMMARY OF THE INVENTION

To that end, the present invention provides a data server for use in networks where media are to be transmitted in packet form. Such media may typically be packetized audio data, packetized video data, packetized control data, packetized information data, and combinations thereof.

The data server comprises at least one card shelf, although there maybe more than one card shelf in some circumstances where necessary.

In any event, the at least one card shelf will contain an active bus controller card, and at least one other card. There may also be a redundant bus controller card.

There is also a backplane which is present on the card shelf; and the backplane includes a media bus group having a plurality of media buses therein.

Each card on the shelf has a plurality of ports on it, and data in packet form maybe transmitted to and from each port over the backplane.

The plurality of media buses are adapted to carry media data in packet form among the cards which are installed on the shelf.

Each media packet of data which is to be sent over the media buses has a routing header added to it. Each media packet is sent over at least one of the plurality of media buses to at least one of the at least one media processor cards on the shelf.

Framing information and clock pulse strings are passed to each card on the shelf, over the backplane.

Each card on the shelf is assigned a specific shelf position on the media bus group so that data sent from each card on the shelf has a specific shelf position of source which is identified within the media packet when it is sent. Also, any media packet which is being addressed to a specific card on the shelf will include the respective shelf position of that card in its routing header.

Each time the bus controller card senses a failure of any other card, or of any bus on the backplane, or each time the shelf controller card is informed of such a failure, that card or bus is isolated by the bus controller card, and media packets which are intended to be sent to the isolated card or over the isolated bus are sent elsewhere.

Typically, the at least one other card on the shelf is a media processor card.

In some instances as noted hereafter, the at least one card shelf will contain a redundant bus controller card.

Moreover, a data server in keeping with the present invention will typically include a plurality of media processor cards.

In keeping with the present invention, the active bus controller card will control access to the media bus group, so as to control which one or ones of the plurality of media buses will transmit media packets at any designated time.

When any two cards on the shelf report a fault with the active bus controller card, the redundant bus controller card will disable the active bus controller card and become a new active bus controller card.

Also, at any instant in time, any media packet maybe sent from any port on any one card to any other port on any card on the shelf.

In a typical data server in keeping with the present invention, when any one port on any one card sends a plurality of media packets over a plurality of media buses to a single destination port on a single card, each media packet on each media bus differs from each media packet on each other media bus.

Moreover, when a plurality of media packets is sent by said any one source port, they will be received by the destination port in the same order they were sent by the source port.

Another provision of the present invention is that whenever a failure is detected on any one of the plurality of media buses, the active bus controller card will isolate the failed bus. Thus, media packets will be permitted to be transmitted across the remaining media buses.

Likewise, when a failure of any card is detected, the active bus controller card will isolate the failed card. Thus, media packets will be permitted to be transmitted across the backplane to the remaining cards on the shelf.

Still further, if any one card detects a failure reading data from a specific media bus, the active bus controller will refuse to permit transmission of media packets over that specific media bus to that one card.

Another provision of the present invention is that any card on the shelf can raise a flow control flag for any port on that card, which flow control flag will be recognized by the active bus controller card so as to preclude flow of media packets to any port on which the flow control flag has been raised.

A common configuration of a data server in keeping with the present invention is to be configured as a media server for use in networks wherein packetized voice data are transmitted through the network.

However, a data server in keeping with the present invention may be configured as a media gateway for use in networks wherein packetized voice data are transmitted through the network.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

Figure 1:
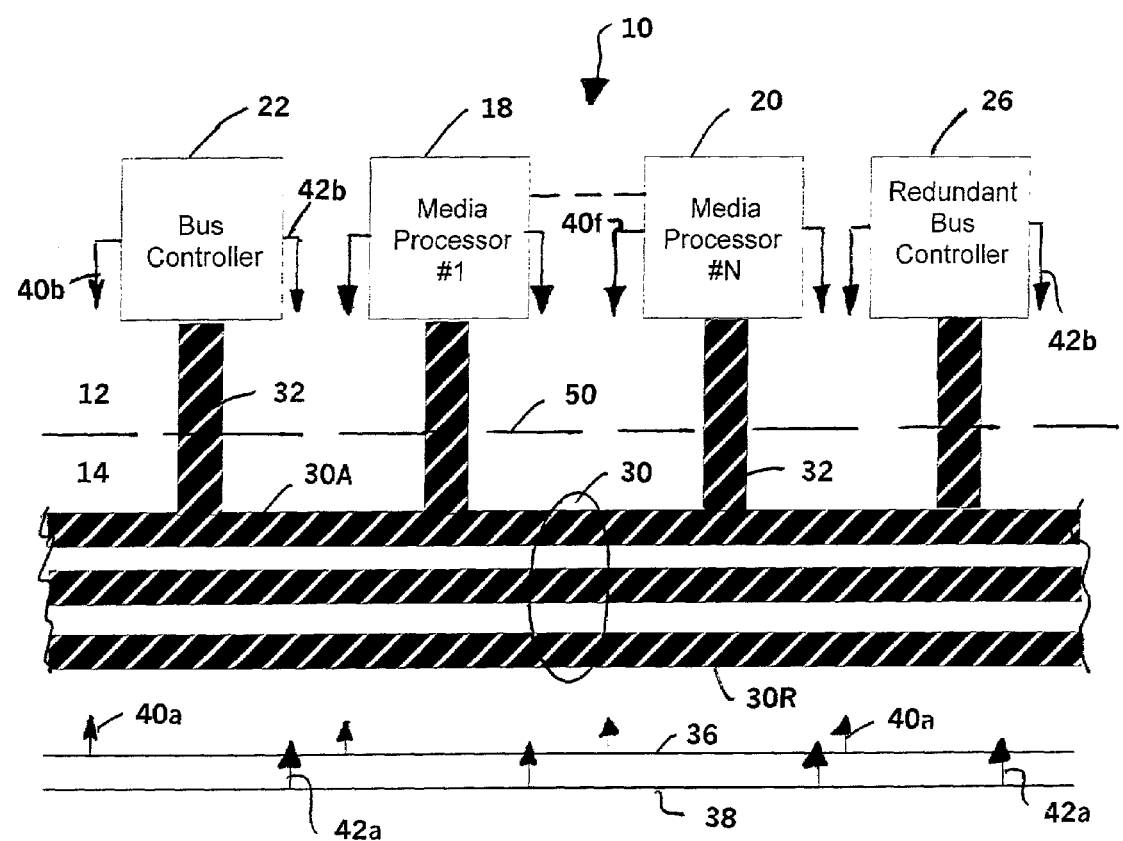
FIG. 1a is a block schematic of a data server card shelf, in keeping with the present invention
FIG. 1b illustrates a packet with a routing header.
Figure 1:
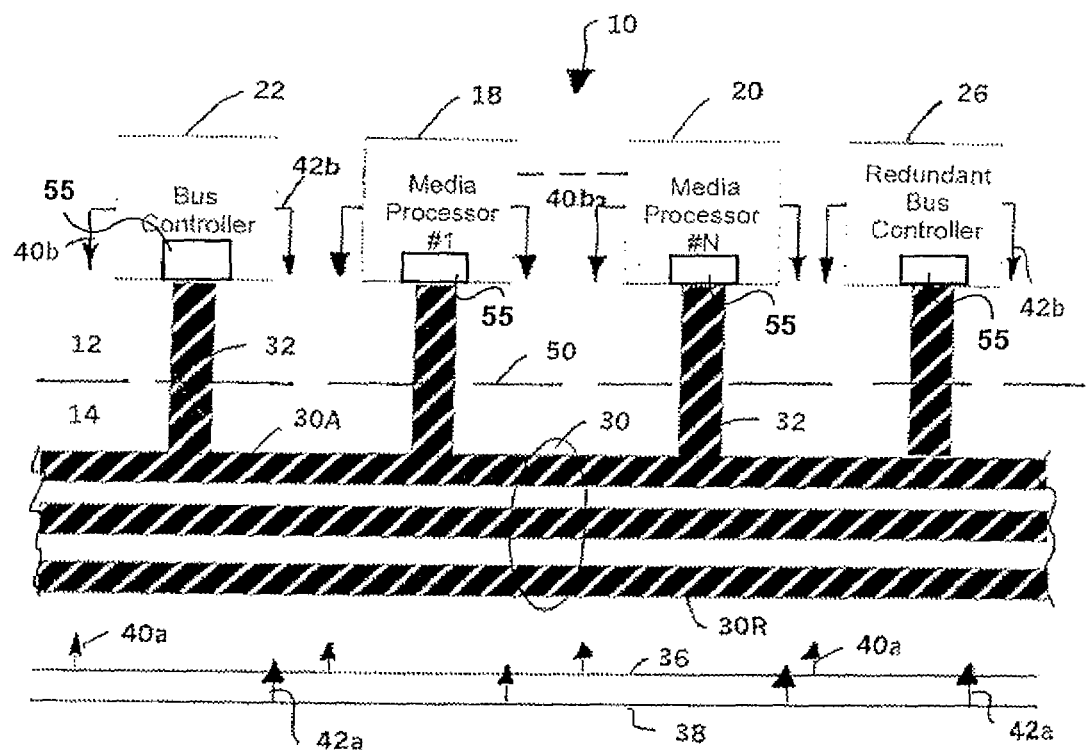

Turning to FIG. 1a, a block schematic for a card shelf for a data server which is configured as a media server, is shown at 10. The media server is intended to process media which are transmitted in packet form, particularly packetized audio data, packetized video data, packetized control data, packetized information data, and combinations thereof.

The shelf typically has a number of card slots which are found on the card shelf 12 of an interface 50. On the other side of interface 50 there is a backplane 14.

Various cards will be installed in the card slots on the shelf 12. They include a bus controller card 22, and at least one media processor card 18, 20, and optionally a redundant bus controller card 26. The cards have ports 55 connected to the respective buses 32. It will be noted that media processor card 18 is identified as number 1; and media processor card 20 is identified as number N.

Typically, the active bus controller card 22, and the redundant or standby bus controller card 26, if present, are installed in the first and last card slots on the shelf 12.

The backplane includes a media bus group 30 which has a plurality of media buses 30A to 30R.

Each of the cards 16 . . . 26 is connected to the media bus group 30 by way of media bus connectors 32. The active bus controller card 22 controls access from the ports on each processor card 20 to each of the media buses 30A to 30R.

Typically, the plurality of media buses 30 is adapted to carry media packets among the cards installed on the shelf, including packetized audio data, packetized video data, packetized control data, packetized information data, and combinations thereof.

Whenever media packets are to be sent over the buses, they will each have a routing header added thereto.

Also, each media packet that is sent over at least one of the plurality of media buses 30 is sent to at least one card 22, 18, 20, or 26.

Framing information and clock pulses are passed from buses 36 and 38, respectively, which are also found on the backplane; and they are passed from the buses at 40a and 42a to the respective cards at 40b and 42b, respectively.

A plurality of media packets to a plurality of destinations can be transmitted over a plurality of media buses in parallel.

A plurality of media packets from a single source port to a single destination port can be transmitted over a plurality of media buses in parallel, and time order will be recovered at the destination port.

When a port on a card wants to transmit a media packet to a port on another card it will place a request onto a media bus. The bus controller will then read the request, determine which media bus the packet can be sent over, then grants that media bus to the requesting port. The port will then place the media packet onto the media bus that the grant was issued on.

Along with transmitting requests, each card will transmit flow control data. The flow control data specifies which ports and which media buses the card is able to receive media packets on. This information is used by the bus controller when determining which requests to grant on which media bus.

Framing information and clock pulse strings are passed to each card on the shelf, over the backplane. The framing information is used by cards and the bus controller to determine the start times of packets, and the time slots to transmit requests, flow control data and grants.

A check sum is contained within each packet, each request and each grant that is transmitted onto the backplane.

Figure 1B:
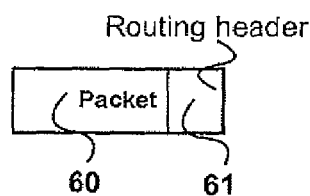

When any card writes a packet 60 (FIG. 1*b*) to a media bus, the bus controller will read the checksum that it has written within the routing header 61. If the bus controller should read a faulty checksum, the bus controller will assume a faulty bus, and stop granting that media bus, but will continue to grant and allow media packets to be transmitted over the remaining media buses.

However, if the bus controller receives a second packet with a faulty checksum from the same card, but on a different media bus, the bus controller will assume the card is faulty, and will stop issuing grants to that card, but will continue to issue grants and allow media packets to the transmitted to and from remaining cards in the shelf When the active bus controller transmits any grants, all cards will read the checksum within the grants. If a card should read a faulty checksum from the grant, the cards assumes that the bus the grant was transmitted on is faulty, and will permanently set its flow control flag for that bus. This will prevent the bus controller from allowing any packets to the transmitted to that card over that bus. The card will also raise a flag indicating that a problem was seen from the active bus controller.

When the active bus controller writes any grants to the media bus, it will also write a checksum with the grant. The redundant bus controller will read the checksum output by the active bus controller. If the redundant bus controller reads an invalid check sum from the active bus controller, and another card has also raised a flag indicating a problem with the active bus controller, the redundant bus controller will disable the active bus controller, and become the active bus controller.

Figure 2:
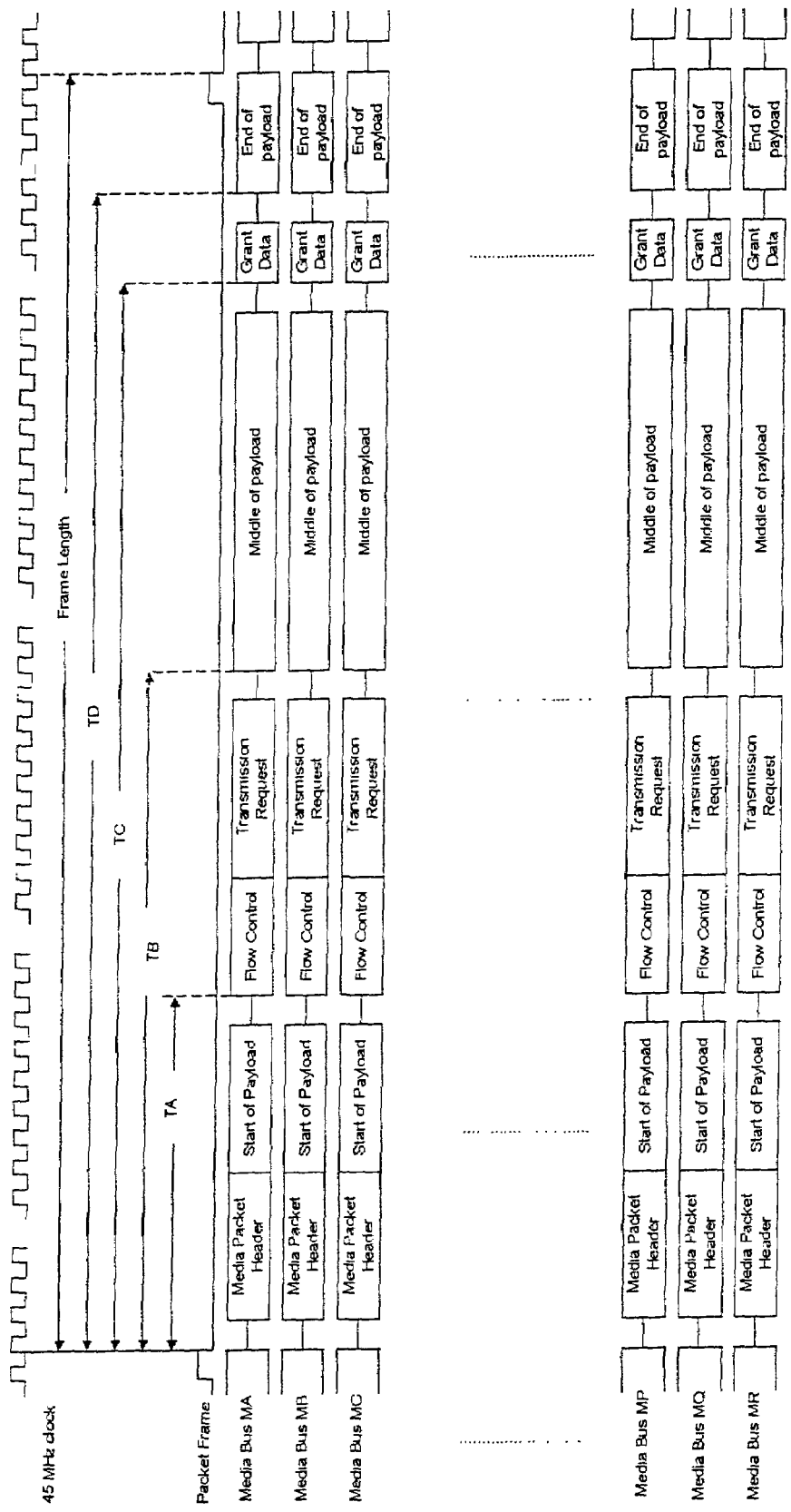
FIG. 2 shows a time based representation of a single media frame.

Turning to FIG. 2, a snapshot of the media bus during a single frame is shown.

The media bus group 30 may typically have up to 18 buses, each of which is 8 bits wide, and which may run, for example, at 45 MHz.

Each card will transmitits flow control information onto a specific media bus, at time "TA" after the packet frame starts. The media bus that the card outputs its flow control onto is a predetermined default. For the purpose of this explanation, assume that the card in slot 1 will by default place its flow control information onto media bus MA, and the card in slot 2 will place its flow control information onto media bus MB, etc. For this assignment to work, M must be greater or equal to N, where M is the number of media buses, and N is the number of cards in the shelf. The difference between the two (M-N) is the number of spare buses. A card may place its flow control data onto a spare bus in the case of a failure being detected on its default bus.

Immediately following the flow control information, the card will place its request list onto the same media bus that it placed its flow control information. Included in the request list is a checksum.

The active bus controller card will read the flow control and request information from the backplane. The bus controller will read all requests from all cards, and place grants at time "TC" after the start of a frame, onto each media bus that has been granted. If a media bus is not granted, then a null grant is placed on that media bus. All grants, either valid or null, contain a checksum.

Any port on any card can transmit any packet onto any media bus, as long as it had been issued a grant for that bus during the previous frame.

Any port on any card can receive a packet from any media bus.

In response to a transmit request, the active bus controller will issue a grant if the media bus is available, and the destination card does not have that media bus flow controlled, and the destination port is not flow controlled. If any of these criteria fail, then a grant is not issued for that request, and the requesting card will retransmit the request during the following frame.

When processing requests, the active bus controller 22 will always grant the requests in the order that it received them, and will grant media buses in a predetermined order. For example, if two requests for a single destination are processes during the same frame, and if it is determined that media bus A, media bus D and media bus H can accommodate the requests, then media bus A will always be granted to the first request, and media bus D will be granted the second request. By having the destination port read the media packets from the media bus in the same predetermined order (A before D), order is maintained, even when multiple packets from the same source to the same destination are transferred across the media bus in the same frame.

Once a card has been granted a bus, that card will place the specified media packet onto the media bus that it received the grant on, during the following frame. The card first places the packet header onto the media bus. The packet header contains the source card and source port identities, and the destination card and destination port identities, as well as a check sum. The card will then place the packet payload onto the media bus until time "TA". The card will then place the payload once again onto the media bus from time "TB" until time "TC". At time "TD", the card will place the remaining payload onto the media bus, until the end of the frame.

Between each time slot within which a media packet may be sent, there may be a predetermined number of clock cycles (typically, one) which allow for the backplane drivers to be turned on and off without conflict.

When any card writes a packet to a media bus, the active bus controller 22 will read the checksum that it has written within the packet's routing header. If the bus controller should read a faulty checksum, the bus controller will assume a faulty bus, and stop granting that media bus; but it will continue to grant and allow media packets to be transmitted over the remaining media buses. If the specified bus is the default bus for a card to place its flow control and request data, then the bus controller will place a special grant onto a spare bus. Upon reading this special grant, the specified card will start placing its flow control and request data onto the spare bus. However, if the active bus controller 22 receives a second packet with a faulty checksum from the same card, but on a second media bus, the bus controller will assume the card is faulty, and will stop granting requests to that card. On the other hand, the bus controller will continue to grant requests and allow media packets to be transmitted to and from the remaining cards in the shelf.

When the active bus controller 22 transmits any grants, all cards will read the checksum within the grants. If a card should read a faulty checksum from the grant, the card assumes that the bus the grant was transmitted on is faulty, and will permanently set the flow control flag for that bus. This will prevent the bus controller from allowing any packets to be transmitted to the card over that bus. The card will also raise a flag stating that it has received a failure from the active bus controller 22.

When the active bus controller 22 writes any grants to the media bus, it will also write a checksum with the grant. The redundant bus controller 26 will read the checksum output by the active bus controller 22. If the standby bus controller 26 reads an invalid check sum from the active bus controller 22, the redundant bus controller 26 will check to see if any other cards have seen a failure from the active bus controller. If another card has reported a failure, the redundant bus controller will proceed to disable the active bus controller, and then become the active bus controller itself.

A media server for use in networks where media packets are transmitted has been described, particularly with respect to the architecture of the backplane which includes a media bus group having a plurality of media buses. Examples of the manner in which packet data flow is controlled have been described, and various alternatives and optional configurations have been mentioned.

However, as noted, while a typical configuration for data servers in keeping with the present invention is as media servers for use in net works—wherein packetized voice and other data are transmitted through the net work, they may also be configured as media gateways for use in similar or identical net works for packetized audio and other data.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A data server for use in networks where media are transmitted in packet form, where such media are chosen from the group consisting of packetized audio data, packetized video data, packetized control data, packetized information data, and combinations thereof, said data server comprising:

at least one card shelf containing a common active bus controller card, at least one media processor card and a backplane;

wherein each media processor card has a plurality of ports from and to which data in packet form is transmitted over said backplane;

wherein said backplane includes a media bus group having a plurality of media buses therein;

wherein said common active bus controller card controls access from said plurality of ports on each of said media processor cards to each of said media buses within said media bus group;

wherein each port on any said media processor card can transmit any media packet onto any said media bus under the control of said common active bus controller card;

wherein each port is configured to place a request on a said media bus when it wants to transmit a media packet to a port on another media processor card;

wherein the media processor cards transmit said requests to said common active bus controller card;

wherein in response to said request, said common active bus controller card is configured to determine which media bus the media packet can be sent over, whereupon said bus controller card grants that media bus to the requesting port and said requesting port places the media packet onto that media bus;

wherein said plurality of media buses are adapted to carry media data simultaneously in packet form among the media processor cards installed on said shelf;

wherein each media packet has a routing header added to it, and wherein each said media packet is sent over at least one of said plurality of media buses to at least one of said at least one media processor cards on said shelf;

wherein framing information and clock pulse strings are passed to each of said bus controller card and said media processor cards on said shelf over said backplane;

wherein each media processor card on said shelf is assigned a specific shelf position on said media bus group, whereby each media packet that is sent from each media processor card on said shelf has a specific shelf position of source which is identified within said media packet when it is sent;

wherein any media packet that is being addressed to a specific media processor card on said shelf contains the respective specific shelf position of that media processor card in its routing header;

wherein each time said common active bus controller card senses a fault on any media processor card or any bus on said backplane, or is notified of such a fault, said common active bus controller card stops granting requests to said any media processor card or granting access to said bus while continuing to grant request to remaining media processor cards and buses that have not been identified as faulty; and wherein said media buses run in parallel to provide bus redundancy such that in the event of failure of any one bus the remaining said media buses continue to operate and carry packet data between said media processor cards installed on said shelf.

2. The data server of claim 1, wherein said at least one card shelf further contains a redundant bus controller card.

3. The data server of claim 2, wherein when any two media processor cards on said shelf report a fault with said active bus controller card, the redundant bus controller card will disable the active bus controller card and become a new active bus controller card.

4. The data server of claim 1, wherein at any instant in time, any media packet may be sent from any port on any one media processor card to any other port on any media processor card on said shelf.

5. The data server of claim 1, wherein when any port on any media processor card sends a plurality of media packets over a plurality of media buses to a single destination port on a media processor card, each media packet on each media bus differs from each media packet on each other media bus.

6. The data server of claim 5, wherein the plurality of media packets sent by said any one source port are received by said destination port in the same order they were sent by said source port.

7. The data server of claim 1, wherein if any one media processor card detects a failure reading data from a specific media bus, the active bus controller will refuse to permit transmission of media packets over that specific media bus to that one media processor card.

8. The data server of claim 1, wherein any media processor card on said shelf can raise a flow control flag for any port on that media processor card, which flow control flag is recognized by said active bus controller card so as to preclude flow of media packets to any port on which said flow control flag has been raised.

9. The data server of claim 1, wherein said data server is configured as a media server for use in networks wherein packetized voice data are transmitted through said network.

10. The data server of claim 1, wherein said data server is configured as a media gateway for use in networks wherein packetized voice data are transmitted through said network.

* * * * *